United States Patent [19]
Watanabe

[11] Patent Number: 5,090,729
[45] Date of Patent: Feb. 25, 1992

[54] AIR BAG FOR A PASSENGER

[75] Inventor: Kazuo Watanabe, Echi, Japan

[73] Assignee: Takata Corporation, Tokyo, Japan

[21] Appl. No.: 626,139

[22] Filed: Dec. 12, 1990

[30] Foreign Application Priority Data

Dec. 15, 1989 [JP] Japan .................................. 1-324924

[51] Int. Cl.$^5$ ............................................. B60R 21/20
[52] U.S. Cl. ................................... 280/743; 280/730; 280/731
[58] Field of Search ............... 280/728, 743, 730, 731, 280/732

[56] References Cited

U.S. PATENT DOCUMENTS 4,805,930  2/1989  Takada ................................. 280/728

FOREIGN PATENT DOCUMENTS 0052554  2/1989  Japan ................................. 280/743
0247242  10/1989  Japan ................................. 280/728
2-175352  7/1990  Japan ................................. 280/728
0216342  8/1990  Japan ................................. 280/743
90/01436  2/1990  World Int. Prop. O. .......... 280/728

Primary Examiner—Kenneth R. Rice
Attorney, Agent, or Firm—Armstrong, Nikaido, Marmelstein, Kubovcik & Murray

[57] ABSTRACT

The air bag for a passenger includes a plurality of base cloths, and at least a part of the base cloths are in circular, elliptical or oval shape or in the shape similar to a circle or in polygonal shape or in polygonal shape with rounded corners so that they can be automatically sewn by machine. With this arrangement, it is possible that a part of the base cloths in the plurality of base cloths constituting the air bag can be automatically sewn by machine. Therefore, sewing can be done easier, and the time required for the manufacture of the air bag for passenger can be reduced. The air bag for the passenger can flexibly and easily match various complicated shapes in both vertical and lateral directions.

11 Claims, 5 Drawing Sheets

FIG.2(a)
FIG.2(b)
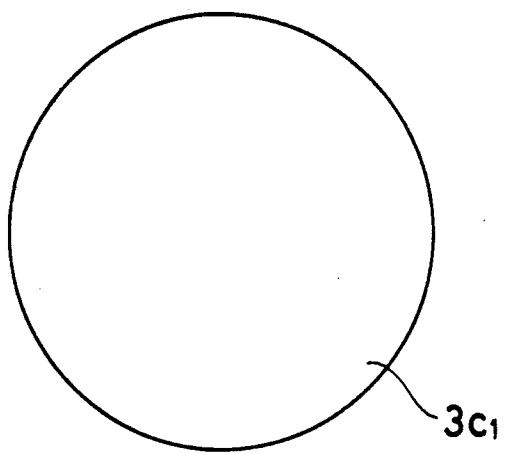
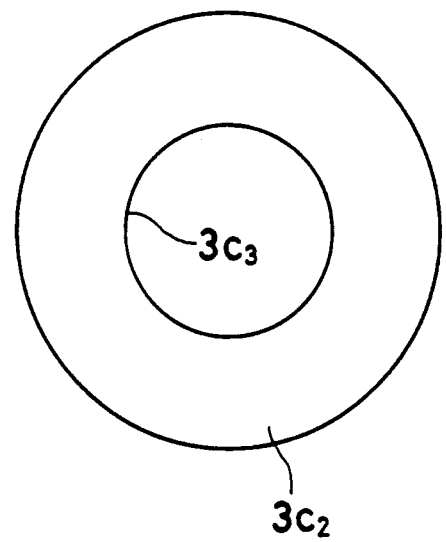
FIG. 3
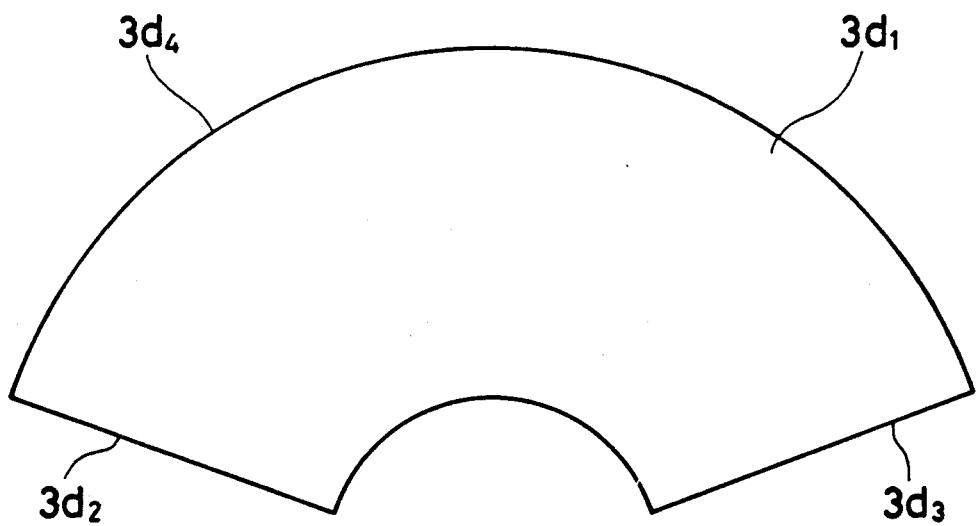

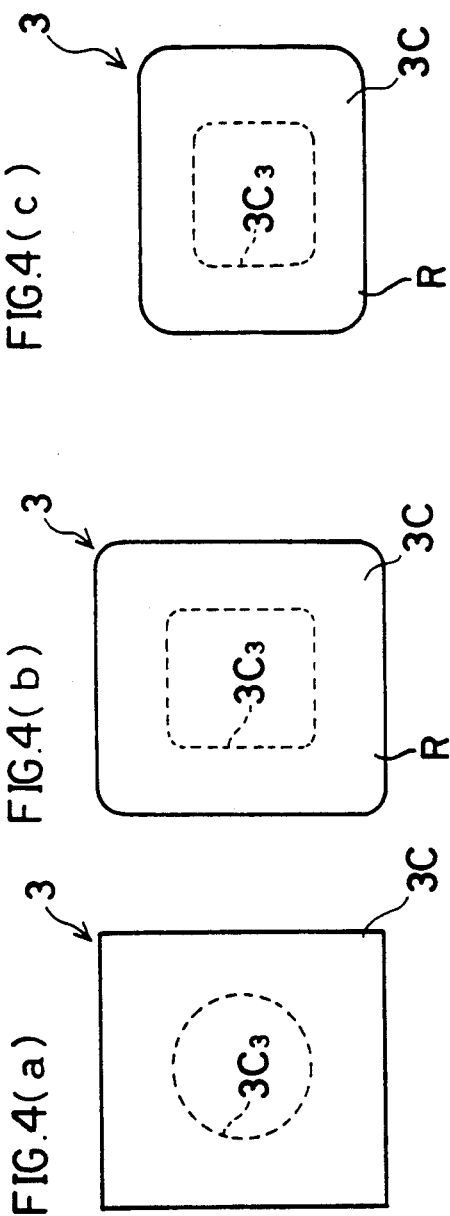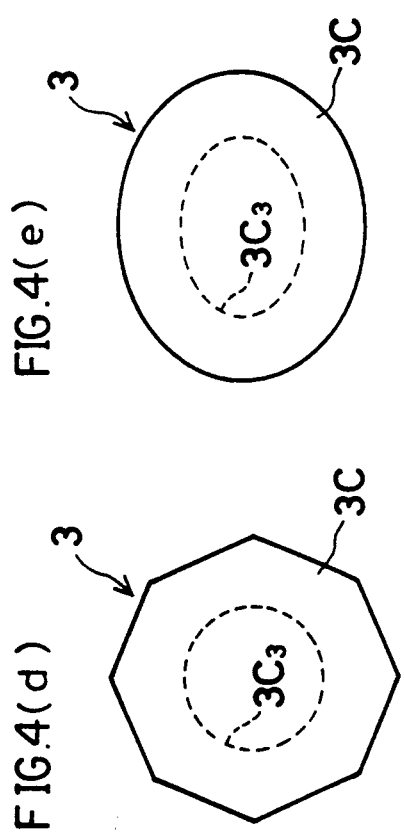

AIR BAG FOR A PASSENGER

FIELD OF THE INVENTION

The present invention relates to an air bag, which comprises a plurality of base cloths and which protects the person in a vehicle when it is inflated by reaction gas from an inflator during a collusion of the vehicle, and in particular to an air bag for passengers in seats other than the driver's seat.

BACKGROUND OF THE INVENTION

The air bag unit, provided on a fixed portion of car body in front of the seat in a vehicle, plays an important role for protecting the passengers in the vehicle from injury due to collision against the car body. The air bag is inflated instantaneously by pressure of a reaction gas released a) from an inflator fixed on the steering wheel for a driver or b) from an inflator fixed on an instrument panel or other fixed portions of a car body for a passenger in case of an emergency such as the collision of the vehicle.

In an air bag unit for a passenger in the assistant seat, as shown in FIG. 6, the gas generating agent in the inflator 2 induces a chemical reaction by a collision signal from a collision detecting sensor (not shown) when the deceleration of the vehicle exceeds a certain level. The air bag 3 is instantaneously inflated and expanded by the generated reaction gas. Then, the air bag 3 receives the person M, who is thrown forward by inertia and protects the person M from collision against the car body.

A large space is present between the assistant seat and instrument panel or front windshield. Moreover, such a large space is often asymmetrical from the left and right of the car body, and such an asymmetrical shape differs widely according to each car model. In this respect, the conventional type air bag 3 for a passenger is formed in a complicated shape as shown in FIG. 7 in order to effectively protect the passenger by properly fitting the shape of such a large space.

When the air bag 3 takes such a complicated shape, the sewn shape when base cloths 3a and 3b are sewn up becomes also complicated as shown in FIG. 7, and it is not possible to automatically sew up the air bag 3 by machine. As a result, the conventional type air bag 3 for a passenger is manually sewn.

The same problem exists with the air bags for the passengers in the back seats, although these are not shown in the figures.

Manual sewing of these base cloths 3a and 3b results in intricate sewing for the air bag 3, and a lot of time is required for producing the air bag 3. Because the base cloths of complicated shape are sewn up, the convention type air bag for passengers does not flexibly fit a wide variety of asymmetrical shapes, which differ according to each car model. As the result, there have been problems with the conventional type of air bag for passengers, such as low productivity or high manufacturing cost.

SUMMARY OF THE INVENTION

It is an object of the present invention to offer an air bag for a passenger, which can automatically be sewn up by machine at least partially.

Another object of the invention is to offer an air bag for a passenger, which can flexibly and easily match various asymmetrical shapes in both vertical and lateral directions.

To attain such objects, the air bag for a passenger according to the present invention comprises a plurality of base cloths, and it is characterized in that at least a part of a plurality of base cloths can be automatically sewn up by machine.

In this case, the shapes automatically sewable by machine include: circular, elliptical or oval shape or a shape similar to such a circular shape, and polygonal shape or polygonal shape with rounded corners.

The air bag for the passenger according to the present invention comprises an inflator or an air bag base fixed on a fixed portion of a car body and a passenger receiving unit to receive the passenger, and it is characterized in that the passenger receiving unit is sewn to the air bag base.

In this case, at least a part of a plurality of base cloths can be automatically sewn up by machine.

In the air bag for the passenger according to the present invention with such an arrangement, at least a part of a plurality of base cloths can be automatically sewn up by machine. Therefore, sewing is performed easier, and the time required for the manufacture of the air bag for the passenger can be reduced.

In the air bag for the passenger according to this invention, the air bag base can be connected to any desired position of the passenger receiving unit. Accordingly, it is possible to form the air bag for passengers in order to flexibly and easily match various asymmetrical shapes in both vertical and lateral directions.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

BRIEF DESCRIPTION OF THE DRAWINGS

FIGS. 2(a) and (b) and FIG. 3 show base cloths to be used in the embodiment;

FIGS. 4(a)–(e) represent other embodiments of the invention;

DESCRIPTION OF THE PREFERRED EMBODIMENTS

Figure 1:
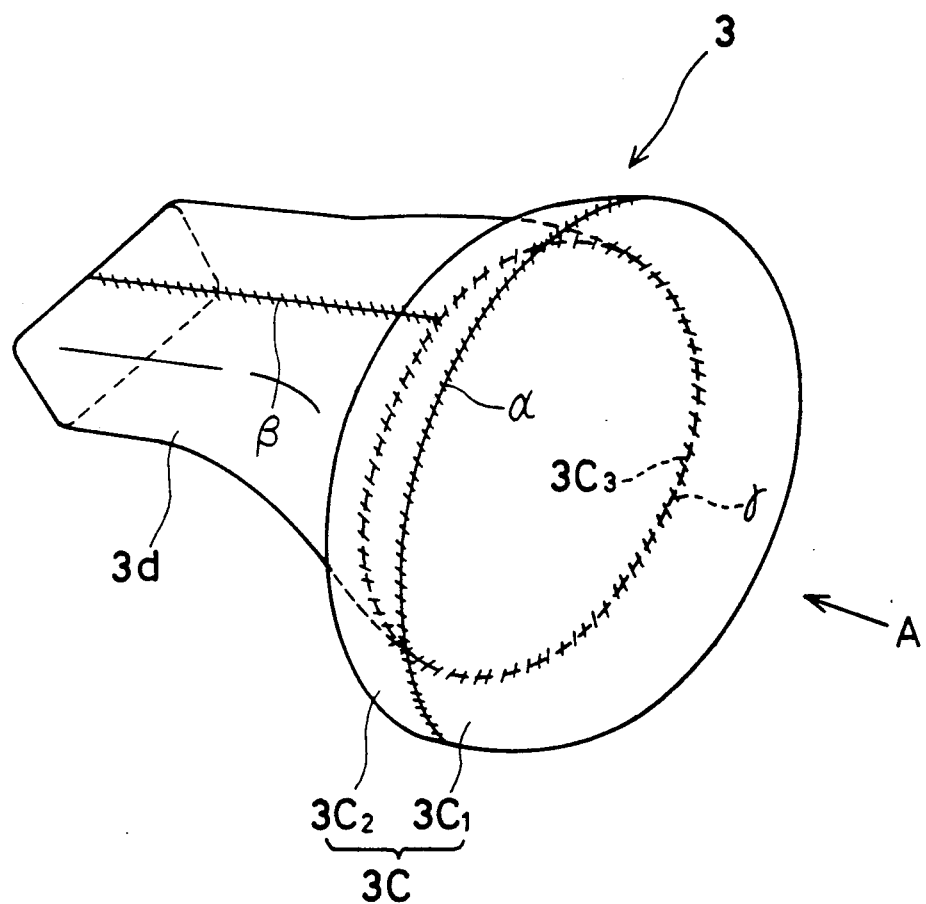
FIG. 1 is a perspective view showing an embodiment of an air bag for a passenger according to the present invention.

An air bag unit 1 is shown in FIG. 1. In the figures, the same component is referred to by the same reference symbols, and a detailed description is not given here.

As shown in FIG. 1, the air bag 3 for a passenger comprises a passenger receiving unit 3c mounted face-to-face to the passenger and used for receiving the passenger and an air bag base 3d fixed on an inflator or on a fixed portion of a car body.

The passenger receiving unit $3c$ consists of a base cloth $3c_1$ facing toward the passenger and a base cloth $3c_2$, to which the air bag base $3d$ is connected. As shown in FIGS. 2(a)-2(b), these base cloths $3c_1$ and $3c_2$ are cut in a circular shape of the same size. The base cloth $3c_2$ is provided with a circular hole $3c_3$, through which reaction gas from the inflator flows. By sewing ($\alpha$) the outer periphery of the base cloth $3c_2$ on the air bag base $3d$ with the base cloth $3c_1$ on the passenger side, the passenger receiving unit $3c$ is provided in the form of a bag.

As shown in FIG. 3, the base cloth $3d_1$ of the air bag base $3d$ is formed in the shape of a sector. By sewing (B) both ends $3d_2$ and $3d_3$ of the base cloth $3d_1$, the air bag base $3d$, in the shape of a truncated cone, is formed.

To form such an air bag 3 for a passenger, the air bag base $3d$ in the shape of the truncated cone is formed by sewing ($\beta$) both ends $3d_2$ and $3d_3$ of the base cloth $3d_1$ manually. In this case, the sewing (B) of both ends $3d_2$ and $3d_3$ of the base cloth $3d_1$ is performed manually, while this can be done in a relatively short time because it is straight sewing. Next, the outer periphery $3d_4$ of the air bag base $3d$ and the inner periphery of circular hole $3c_3$ of base cloth $3c_2$ are sewn up ($\gamma$) after basting or heat-sealing. In this case, because the outer periphery $3d_4$ of the air bag base $3d$ and the inner periphery of the circular hole $3c_3$ of the base cloth $3c_2$ are in a circular shape, the air bag base $3d$ and the base cloth $3c_2$ are sewn up ($\gamma$) in a circular shape, and this sewing process can be automatically performed by machine. Accordingly, the sewing ($\gamma$) of an air bag base $3d$ with base cloth $3c_2$ can be done in an extremely short time. Finally, after base cloths $3c_1$ and $3c_2$ are combined together, the outer periphery (o) is sewn up. Because the outer periphery of base cloth $3c_1$ and that of $3c_2$ are in a circular shape, these two base cloths $3c_1$ and $3c_2$ are sewn ($\alpha$) in a circular shape. Thus, automatic sewing by machine can be achieved. Accordingly, the sewing ($\alpha$) of these two base cloths $3c_1$ and $3c_2$ can be done in an extremely short time. As a result, the air bag 3 for a passenger as shown in FIG. 1 is formed.

FIGS. 4(a)-4(e) show other embodiments of the air bag 3 for a passenger as seen from the direction of the arrow A in FIG. 1. The same components as the above embodiment are referred to by the same symbols, and a detailed description is not given here.

In the air bag 3 of FIG. 4(a), the passenger receiving unit $3c$ is formed in a square shape when seem from the direction A, and a circular hole $3c_3$ is furnished nearly at the center. In the air bag 3 of FIG. 4(b), the passenger receiving unit $3c$ is formed in a square shape with rounded corners (R), and the hole $3c_3$ in the shape similar to that of the passenger receiving unit $3c$ is furnished nearly at the center. Further, FIG. 4(c) shows a passenger receiving unit $3c$ in a rectangular shape having 4 rounded corners (R) and furnished with a hole $3c_3$ in the shape similar to the rectangular shape. FIG. 4(d) shows a passenger receiving unit $3c$ in a polygonal shape (In the figure, an example in octagonal shape is shown.) and a circular hole $3c_3$ FIG. 4(e) shows an air shape and a hole $3c_3$ in the shape similar to the ellipse. It is needless to say that various types of air bags 3 can be formed by combining the passenger receiving unit $3c$ of various shapes with the hole $3c_3$ of various shapes.

The air bag 3 thus formed is in such a shape that the sewn portion $\alpha$ and $\beta$ can be automatically sewn up by machine. This results in extensive reduction of the time for the manufacture of the air bag 3 and in the improvement of productivity. Thus, the manufacturing cost of air bag can be extensively reduced.

FIGS. 5(a)-5(d) represent other embodiments of the air bag 3 for a passenger similar to the embodiments of FIGS. 4(a)-4(e). The same components in the above embodiments are referred to by the same symbols, and a detailed description is not given here.

Figure 5A:
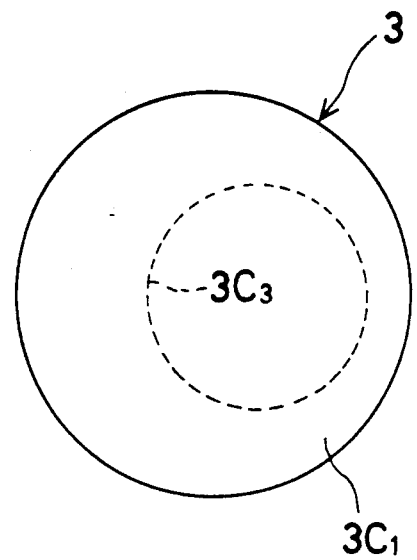
FIGS. 5(a)–(d) show still other embodiments of the invention.
Figure 5B:
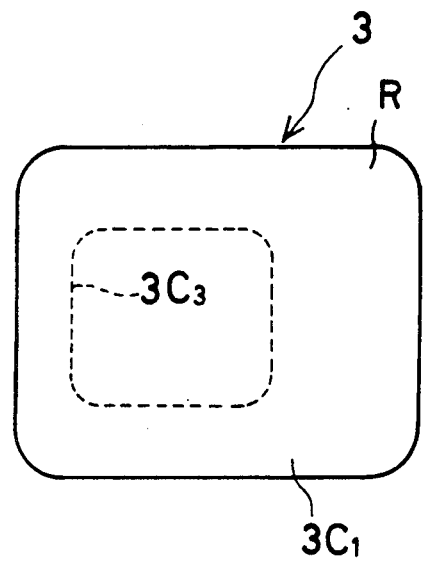
Figure 5C:
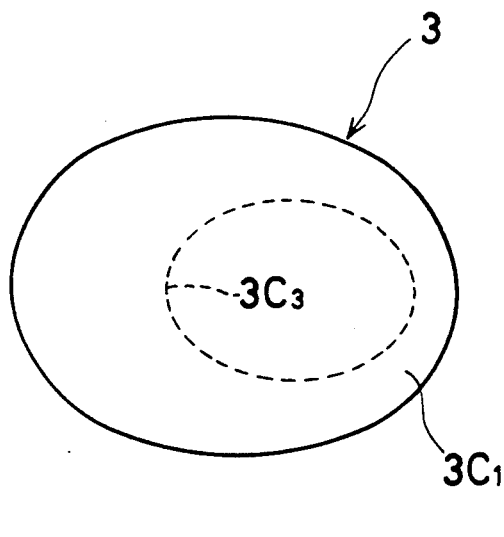
Figure 5D:
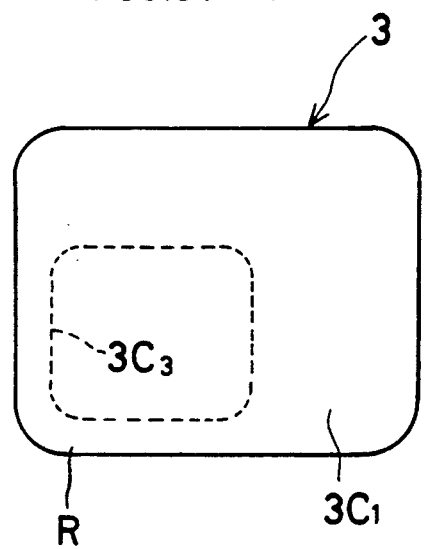
Figure 6:
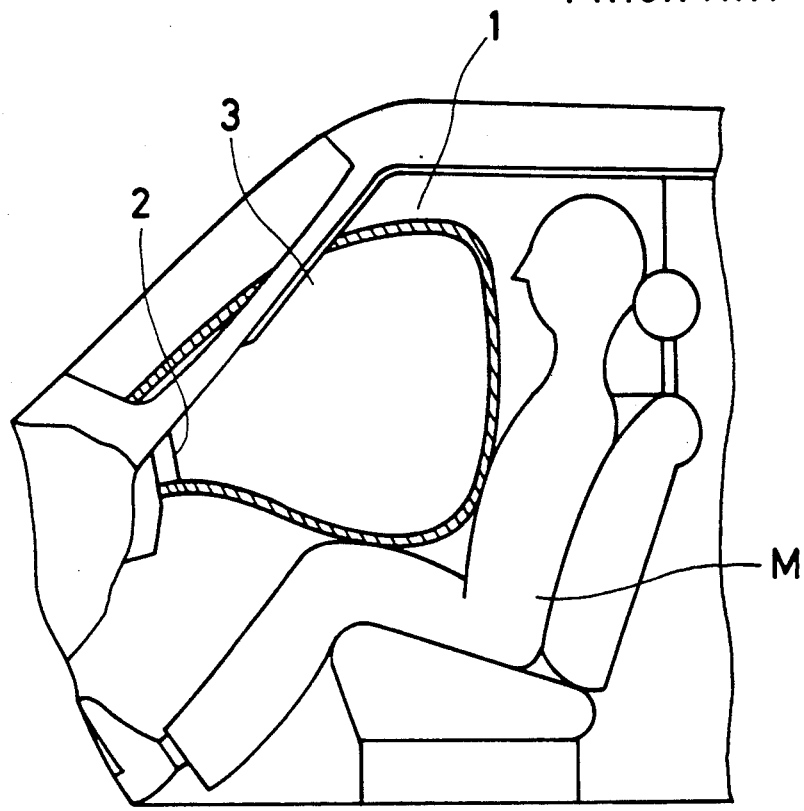
FIG. 6 is a schematical cross-sectional view of an example where the air bag unit for a passenger is mounted on an instrument panel and when the air bag is inflated.
Figure 7:
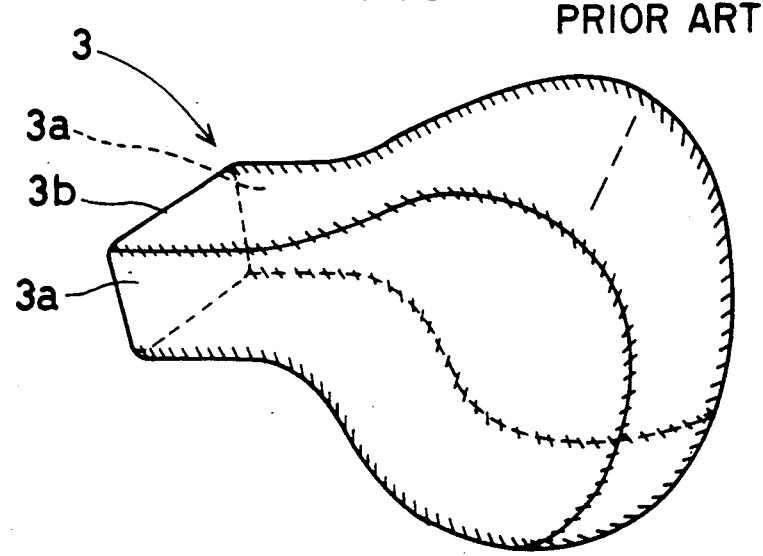
FIG. 7 shows an example of a conventional type of air bag for a passenger.

As shown in FIGS. 5(a)-5(d), the hole $3c_3$ is eccentrically provided to the passenger receiving unit $3c$ in these embodiments. Accordingly, the air bag base $3b$ is eccentrically sewn up to the passenger receiving unit $3c$. FIG. 5(a) shows a combination of a passenger receiving unit $3c$ in a circular shape and a circular hole $3c_3$ provided eccentrically toward the right in this passenger receiving unit $3c$. FIG. 5(b) shows a combination of a passenger receiving unit $3c$ in a rectangular shape with rounded corners R and a hole $3c_3$ in the shape similar to the rectangular shape and furnished eccentrically toward the left in this passenger receiving unit $3c$. FIG. 5(c) shows a combination of an elliptical passenger receiving unit $3c$ and a hole $3c_3$ in the shape similar to the ellipse and furnished eccentrically toward the right in this passenger receiving unit $3c$. FIG. 5(d) shows a combination of rectangular passenger receiving unit $3c$ with rounded corners R and a hole $3c_3$ in the shape similar to the rectangle and furnished eccentrically toward the lower left in the passenger receiving unit $3c$. It is needless to say that various types of air bags can be formed by properly combining the passenger receiving unit $3c$ of various shapes with the hole $3c_3$ of various shapes as in the case of the above embodiments. Also, the degree of eccentricity of the hole $3c_3$ can be set as appropriate.

In this way, by furnishing the hole $3c_3$ eccentrically in the passenger receiving unit $3c$, it is possible to make the shape of the passenger receiving unit $3c$ asymmetrical in a lateral direction when seen from the direction A in FIG. 1 and also to easily change the rigidity of the air bag 3 to the center. The space where the air bag for the passenger is installed, e.g. in case of an assistant seat, has a complicated and laterally asymmetrical shape because of the shapes of the front windshield and the instrument panel. The shape of such a space varies widely according to each car model. The air bag can now easily match the space of a diversified shape.

As it is evident from the above description, it is possible according to the air bag for a passenger of this invention to automatically sew up at least a part of a plurality of base cloths of the air bag by machine. This results in easier sewing and extensive reduction of the time required for the manufacture of the air bag for the passenger. As a result, productivity is greatly increased, and the manufacturing cost can be reduced.

It is possible by the air bag for the passenger of this invention to connect the air bag base to the desired position on the passenger receiving unit. Therefore, the air bag for the passenger can flexibly and easily match the various complicated shapes, which are asymmetrical in both vertical and lateral directions.

What we claim is:

1. An air bag for a passenger, comprising:
    a plurality of base cloths protect a passenger in a vehicle when inflated by reaction gas from an inflator operated in an emergency, including
        an air bag base formed in a shape of a sector, said air bag base fixed on one of said inflator and a fixed portion of a car body, and a passenger receiving unit for receiving the passenger, and said passenger receiving unit is connected to said air bag base.

2. An air bag for a passenger according to claim 1, wherein at least a part of the base cloths in said plurality of base cloths are in such shape that they can be automatically sewn by machine.

3. An air bag for a passenger according to claim 2, wherein said shape automatically sewable by machine is a polygonal shape or a polygonal shape with rounded corners.

4. An air bag for a passenger according to claim 2, wherein said shape automatically sewable by machine is a shape similar to circular shape, i.e. circular, elliptical or oval shape.

5. An air bag for a passenger according to claim 1 wherein said passenger receiving unit having a hole eccentrically placed therein to which said air bag base is connected.

6. An air bag for a passenger according to claim 1 wherein ends of said sector are sewn together to form a truncated cone.

7. An air bag for a passenger according to claim 1 wherein said passenger receiving unit includes a first portion which faces toward the passenger and a second portion to which the air bag base is connected.

8. An air bag for a passenger according to claim 7 wherein said second portion is provided with a hole to which the air bag base is connected.

9. An air bag for a passenger according to claim 8 wherein said hole has a shape of one of circular, elliptical, oval and polygonal.

10. An air bag for a passenger according to claim 8 wherein said hole is centrally located in said second portion.

11. An air bag for a passenger according to claim 8 wherein said hole is eccentrically located in said second position.

* * * * *